United States Patent [19]

De Voss

[11] 3,968,041
[45] July 6, 1976

[54] APPARATUS FOR COLLECTING OIL SLICK FROM A BODY OF WATER

[76] Inventor: Edwin A. De Voss, 1363 Clarence Drive, Vista, Calif. 92083

[22] Filed: Sept. 12, 1973

[21] Appl. No.: 396,348

Related U.S. Application Data

[63] Continuation-in-part of Ser. No. 128,766, March 29, 1971, abandoned.

[52] U.S. Cl............ 210/242 S; 210/DIG. 25; 210/DIG. 26
[51] Int. Cl.² .......................... E02B 15/04
[58] Field of Search.............. 210/83, 242, DIG. 21; 161/21

[56] References Cited
UNITED STATES PATENTS

| | | | |
|---|---|---|---|
| 3,332,828 | 7/1967 | Lane et al. | 161/21 |
| 3,573,147 | 3/1971 | Elbert | 161/21 |
| 3,617,552 | 11/1971 | Will et al. | 210/DIG. 21 |
| 3,617,555 | 4/1970 | Ginsburgh | 210/DIG. 21 |
| 3,617,556 | 11/1971 | Cole et al. | 210/DIG. 21 |
| 3,637,080 | 1/1972 | Markel | 210/242 |
| 3,653,510 | 4/1972 | Fitzgerald | 210/242 |
| 3,667,608 | 6/1972 | Burroughs | 210/DIG. 21 |
| 3,668,118 | 6/1972 | Rhodes | 210/DIG. 21 |
| 3,670,896 | 6/1972 | Hale et al. | 210/242 |
| 3,673,056 | 6/1972 | Nadler | 161/214 X |
| 3,685,653 | 8/1972 | Van Stavern et al. | 210/242 |
| 3,689,407 | 9/1972 | Roodes | 210/DIG. 21 |
| 3,804,251 | 4/1974 | Larrell et al. | 210/DIG. 21 |

*Primary Examiner*—Theodore A. Granger
*Attorney, Agent, or Firm*—Donald D. Mon

[57] ABSTRACT

A system for removing oil slicks from water surfaces such as the ocean, harbors, lakes or ponds. An endless conveyor, for example, the surface of a drum or of a belt, contacts the oil slick, which adheres to it. The slick is conveyed by the conveyor to means for its removal from the conveyor, for example, a wringer. Features of the invention which can variously be utilized are (a) the use of a flexible, relatively limber, flat blade-like cover for the conveyor, such as the well-known artificial grass "Astroturf"; (b) the use of a downwardly-facing region of the conveyor which can overhang and press against the top of the oil slick so the slick can adhere to the conveyor; and (c) the provision of a second conveyor aft of the first conveyor relative to the direction of forward motion of the system, the second conveyor extending below the elevation of the first conveyor, whereby they form an initially wedge-shaped path in which the slick tends to be trapped and drawn. The system can be mounted to floating support means for supporting it relative to the oil slick, and for moving it along the oil slick.

19 Claims, 27 Drawing Figures

INVENTOR.
EDWIN A. de VOSS
BY
Forrest J. Lilly
ATTORNEYS

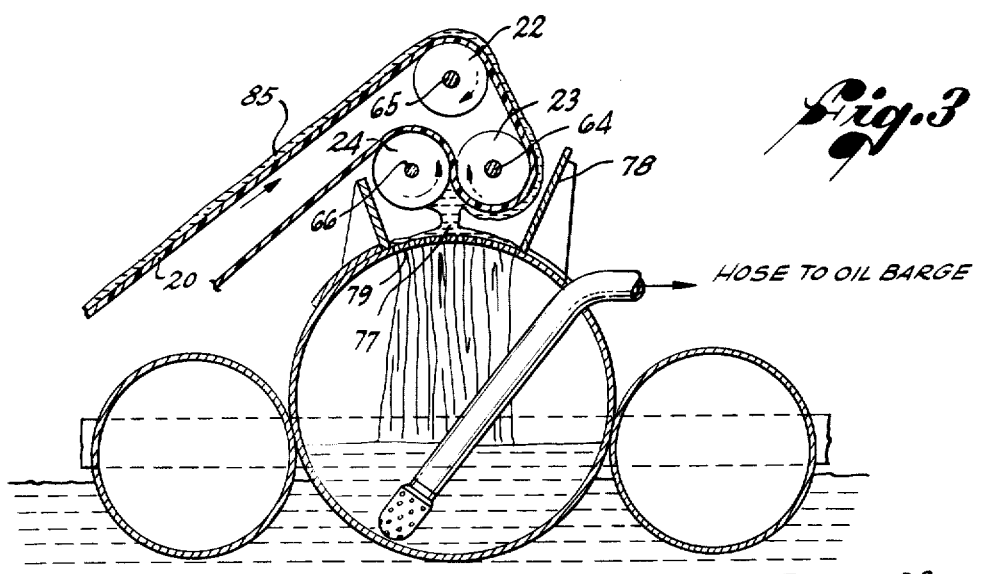
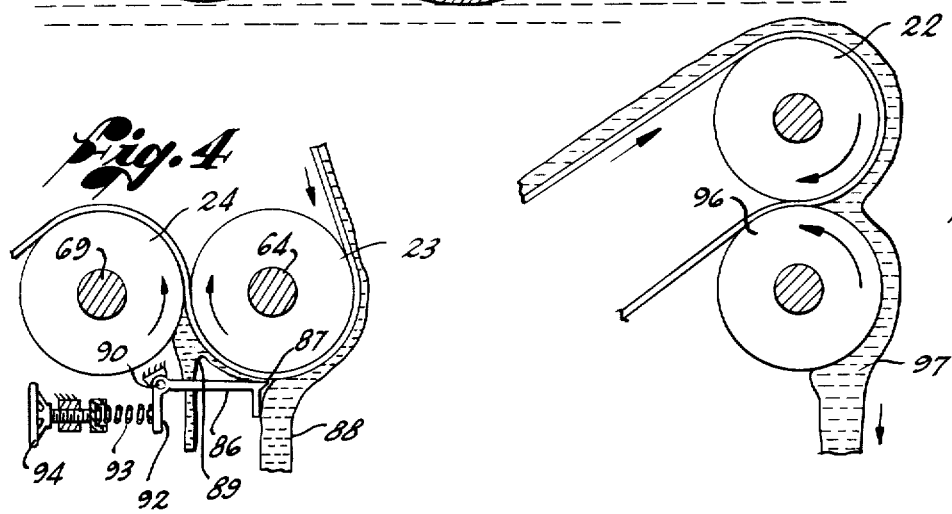
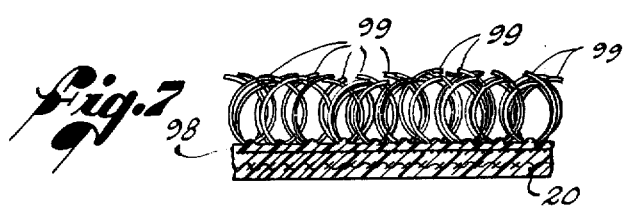
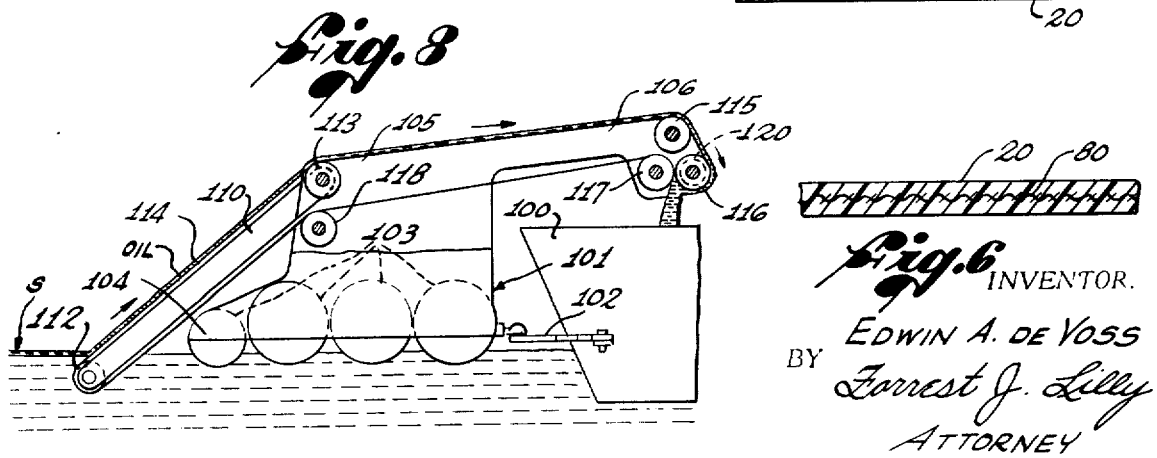

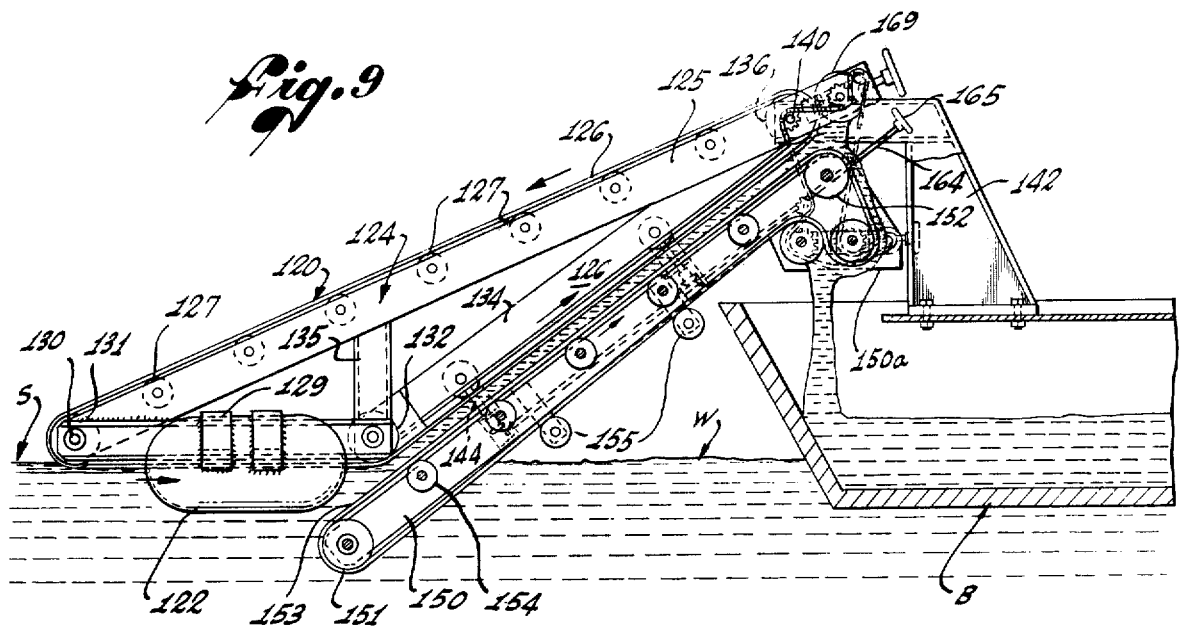
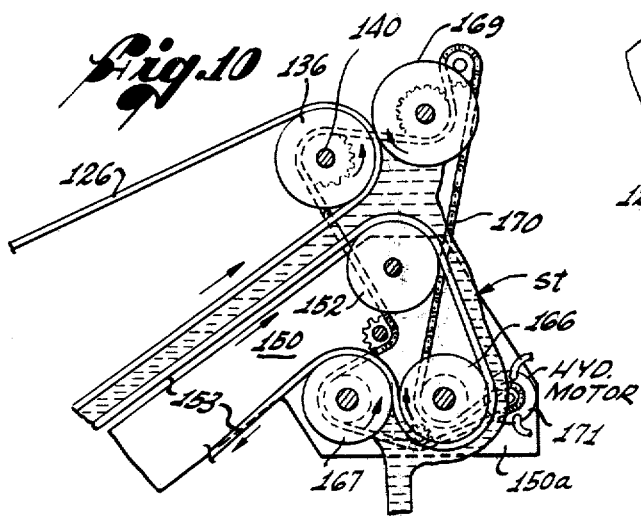
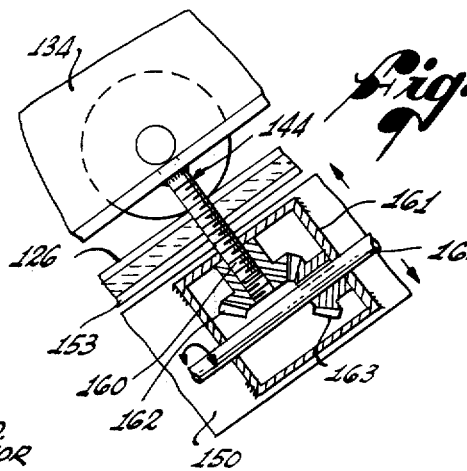
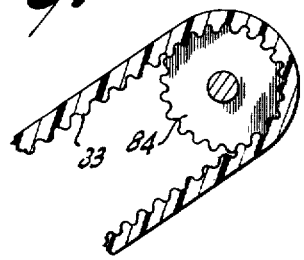

INVENTOR.
EDWIN A. DEVOSS
BY Forrest J. Lilly
ATTORNEY

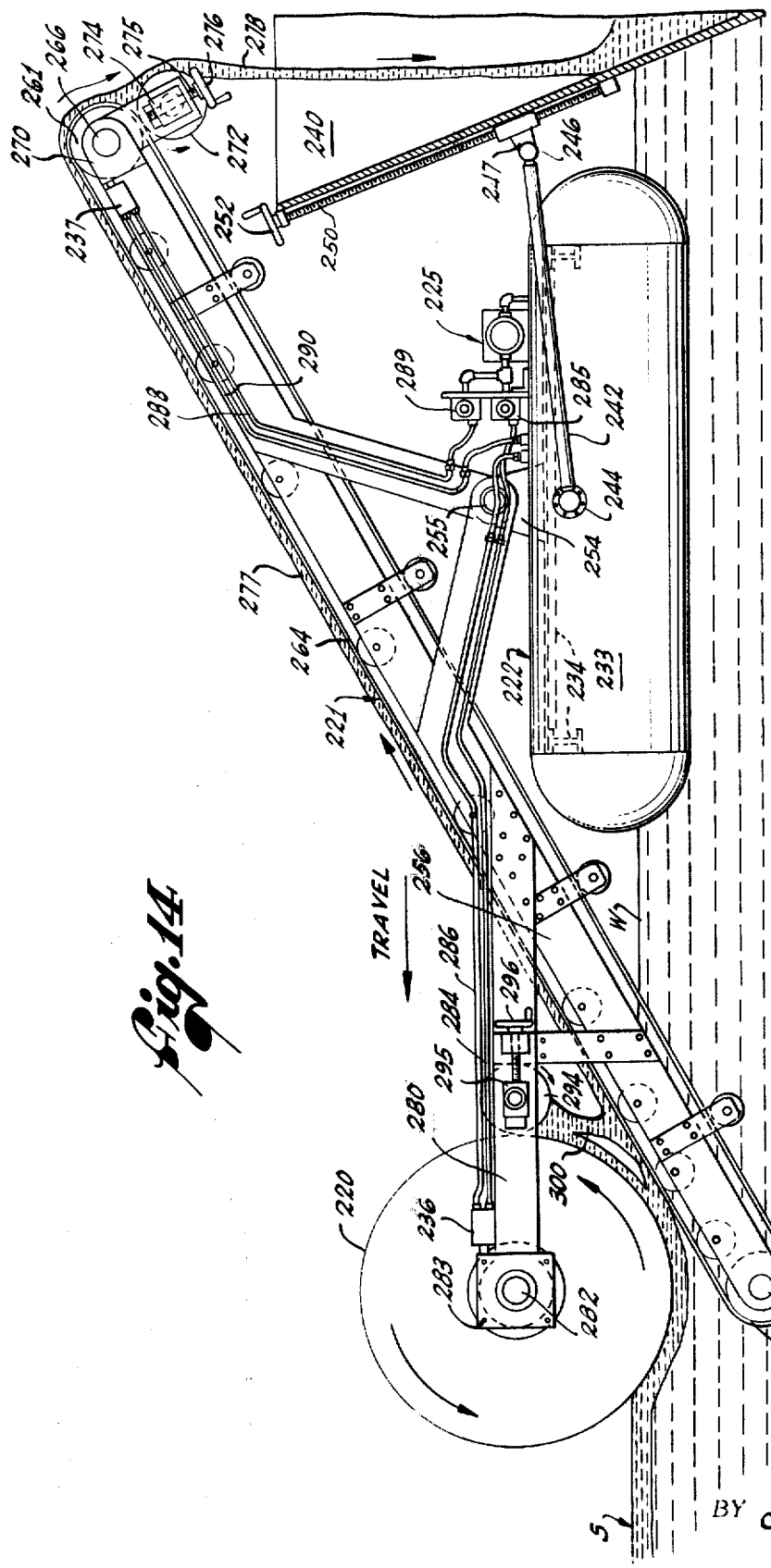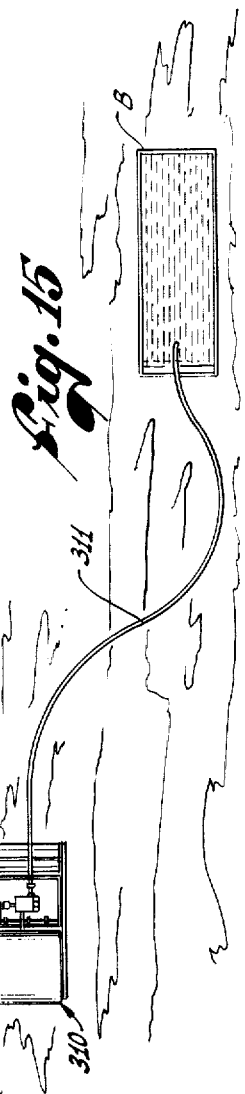

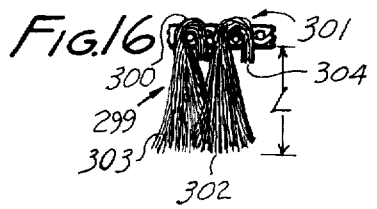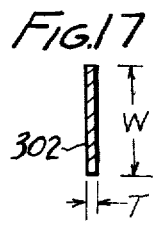

APPARATUS FOR COLLECTING OIL SLICK FROM A BODY OF WATER

REFERENCE TO CO-PENDING APPLICATION

This is continuation-in-part of applicant's co-pending U.S. patent application Ser. No. 128,766, filed Mar. 29, 1971, entitled "Method and Apparatus for Collecting Oil Slick from Body of Water", now abandoned.

FIELD OF THE INVENTION

This invention relates to equipment for recovering oil slicks from the surfaces of large bodies of water, such as from ocean water along seacoasts, within bays or harbors, and the like.

BACKGROUND OF THE INVENTION

Crude oil slicks of large area are sometimes formed on ocean water as a result of loss of crude oil from a ruptured underwater oil well. Slicks of crude and/or fuel oil are also sometimes formed by loss from leaking or ruptured tanker vessels. The damage wrought by such spills is too well-known to require further comment. Much effort has been expended to develop means quickly and efficiently to collect these oil slicks, but nothing has been announced to the present time that will pick up the oil both thoroughly and quickly enough to prevent very serious damage to beaches, harbors, other vessels, wild life, etc., especially when the spill is on large open bodies of water.

The best procedure found to date according to published reports has been to throw straw onto the oil slick, and then to gather up the oil-laden straw. Actually, crude oil, as well as fuel oil, can be quite heavy, viscous, and sticky or adhesive, particularly after exposure to sun and weather on the surface of the water for two or three days. Such heavy, viscous, sticky oil adheres suprisingly well to any object dipped therein. A paddle dipped in heavy crude or fuel oil may lift out a layer of oil approaching a half-inch in thickness on each side. As a further example, I have found that a lead pencil can draw up a tubular blob of oil of, for example, approximately three times its own diameter, depending of course, upon the condition of the oil. A quantity of straw scattered on the oil slick thus can "hold onto" a large proportionate quantity of petroleum. To date, however, so far as I am aware, there has appeared no satisfactory method of collecting the oil-laden straw from the water surface.

The purpose of the present invention is to provide a novel and improved process and an apparatus for picking up oil slicks from the surface of a body of water, and to do so effectively, efficiently, and rapidly enough to constitute a practical solution to the existing problem of menacing oil slicks.

BRIEF SUMMARY OF THE INVENTION

I have discovered that an oil slick can be made to adhere to a surface of a conveyor rising from beneath the water line, or from a level substantially at the water line, but in contact with the oil slick, and travelling continuously between the pick-up point and an elevated point of separation. The conveyor is floated on the water by some buoyant carrier means, so as to contact the oil slick, and then elevate it, while the buoyant carrier means is propelled through the water in a direction to encounter the slick.

The conveyor can be of several styles, and in my experiments I have successfully used both rubberized conveyor belts and drums. The two types can also be advantageously used in combination. For oil that is not too thin, I have found that a smooth-surfaced rubberized fabric conveyor belt, or a rotating metal drum, will pick up the oil in a highly satisfactory manner. In this regard, freshly discharged fuel oil thickens greatly upon one to three days exposure on the surface of the ocean; and if the oil in some case is at first too thin, it will soon thicken sufficiently that it can be picked up readily by a smooth-surfaced belt or drum. I have further discovered, however, that the ability of a conveyor belt, or a drum, to pick up the oil in either a thin or a heavy state can be remarkably improved by furnishing it with a long-napped surface characterized by relatively stiff, but still flexible, filaments or blades which can penetrate into the layer of oil. Thus, taking advantage of the tendency of the oil to adhere or cling to a filament-like element, and multiplying the area many times because the total surface area of many blades mounted to a base area is much greater than the area of the base itself, I am able to cause a relatively thick layer of oil to adhere to the belt or drum. Further, this remains true with relatively thin crudes or fuel oil.

In some cases, i.e., with some types of conveyor drums or belts and, depending upon their direction of rotation or travel and the weather conditions, a thin layer or film of ocean water can be picked up and may intervene between the surface of the belt or drum and the layer of oil, interfering with the ability of the oil to directly contact and adhere to a bare belt or drum, as the case may be. This does not invariably occur, and can be minimized or avoided by proper design of the equipment. However, equipment that would be subject to this failing can be made operative, and even superior, by applying to the conveyor such a "napped" surface treatment, which causes the layer of oil to "hang on" to the penetrating "nap" until the film of intervening water runs out. Moreover, pick-up equipment that would be otherwise satisfactory using a smooth-surfaced conveyor or pick-up belt or drum is in all cases improved in the quantity of oil which it can pick up and raise out of the water by employment of the napped surface.

The basic concept of this surface treatment is to provide the conveyor surface with a multiplicity of filaments held at one end to a base fabric on the surface of the conveyor (belt or drum), and extending therefrom, like the nap of a carpet.

A material I have successfully used for the purpose is the so-called "outdoor" carpet used as artificial grass for athletic contests, such as baseball and football, and now greatly publicized under the name Astroturf. This substance has a textile base and a nap consisting of strands of plastic material composed of polypropylene, which is not adversely affected for the purposes of this invention by water, salt, oil, and most chemicals, and is very tough to resist hard wear. The strands can be looped around the warp of this textile base to form loops, which are also fixed to the base by a suitable cement. The loops can then be cut at the top, leaving flat filaments or blades of a length of the order of an inch and a width of approximately 1/16 to ⅛ inch. These blades are somewhat stiff and resilient, and have a natural curl, so that they extend toward and between one another and thus become interspersed to form a loose mat. Alternatively, they may be generally aligned so as to leave a relatively open path for the oil to flow into as it contacts the blades. These blades are relatively limber. They readily penetrate the lighter, less viscous oil slicks, such as slicks of newly-spilled crude oil, and oils of viscosity up to about SAE 40. The more viscous spills, for example, slicks which have been exposed to the weather for a few days, or even fresh bunker oil, are tougher and more viscous. Pressing a single blade against these more viscous spills will tend to bend the blade, and it will not quickly penetrate the oil, although given more time than one wishes to expend, it usually will. The recovery process is speeded by providing the blades as part of a tufted construction, whereby they remain generally spaced from one another, but give enough side support to one another that as a group they readily penetrate a viscous spill, wherein they act individually and cooperatively to adherently hold the penetrated layer of oil. They are still limber enough readily to be flattened to express the collected oil from the covering or surface. To give an idea of the holding ability of this material, a single 1-inch-long blade thereof dipped into heavy fuel or crude oil will carry away a quantity of oil such that four dips will remove sufficient oil to fill a quarter-teaspoon measure. Surprisingly, a single blade 0.030 inch wide and 0.025 inch thick can pull up an initial "finger" of oil from a weathered slick about 5/32 inch in diameter. When the oil is less viscous only, a lesser diameter finger can be picked up.

The oil can be collected or separated from the conveyor belt or drum by a wringer roll, by a scraper, or by other squeegee means. The "carpeted" or napped form of conveyor is found to readily give up its loading of oil under wringer action substantially as well as a smooth-surfaced conveyor. The oil collected from the conveyor is removed in some convenient way, several forms of which are provided by the invention.

A mat of the "artificial grass" material described may be about a half-inch in thickness, and its fibers, filaments or blades will penetrate, therefore, a half-inch layer of oil and hold it to the mat by the direct adhesion of the oil to its fibers or filaments. An additional half-inch of oil may then, if the oil is relatively heavy, viscous or adhesive, cling to the outside surface of the initial half-inch layer, so that the artificial grass carpet-type surfacing can pick up and transport a layer of oil of approximately an inch in thickness. After standing a while and spreading out from the source of discharge for a little distance, an actual oil slick can have just about such a thickness, and can thus be substantially completely picked up in successive "runs" of the floating rig, picking up say a 10 foot 20 foot wide strip on each run.

The conveyor (belt or drum) is supported by a carrier which is buoyant on the water. In the broadest context, I use the expression "buoyant means" to denote any float, raft, craft, boat, or barge, on which the conveyor can be mounted so as to contact the oil slick on the water surface. I have contrived various arrangements within the scope of the invention. Thus, the conveyor can be supported on a floating platform, or on a float, and the oil can be collected on this floating platform, and transported therefrom to a barge. Alternatively, the conveyor may be mounted directly on the front of a barge, and may float with the barge, or be articulated to the barge, and floated independently of the barge, as on a small independent float or carrier. The conveyor requires propulsion through the water with the lower front end of the conveyor directed toward the oil slick, and this may be accomplished by any suitable means or method. Examples are self-propulsion, as by a raft equipped with driven paddle wheels, or a propeller, or being pushed, as by a self-propelled barge. Many arrangements are possible, and a number of illustrative embodiments will be disclosed.

The following are preferred but optional features of this invention:

a. the use of an artificial grass-type mat, such as the well-known Astroturf on a conveyor which is characterized by being surfaced with a plurality of limber, flat and thin blades for adherence by the oil slick;

b. the use of a belt of any material having a forwardly-extending, rearwardly-moving, downwardly-facing face, which face has a substantial dimension of length along the axis of forward movement of the craft to which it is mounted, said face being disposed so as to overhang and press downwardly against an oil slick for adherence by the oil; and c. the use of either a pair of belts, or of the combination of a forward drum and a rearward, upwardly-inclined belt, the two belts, or the drum and the belt, forming an initially wedge-shaped path at the level of the oil slick, the belts, or the drum and the belt, moving in such a manner as to draw the oil from the slick along said path.

BRIEF DESCRIPTION OF THE DRAWINGS

FIG. 3 is an enlarged view of a portion of FIG. 1, taken in medial section, and with certain structural components omitted for clarity of illustration;

FIG. 3A is a fragmentary view showing a modified means for driving a conveyor belt;

FIG. 3B is another fragmentary view of another modified means for driving a conveyor belt;

FIG. 4 is a fragmentary view showing a modified form of means for removal of oil from the conveyor belt;

FIG. 5 is a fragmentary view showing a modified form of wringer roll means which may be used in the embodiment of FIGS. 1 to 3;

FIG. 6 is a transverse sectional view of a rubberized belt, shown conventionally, such as may be used in the belt conveyor system of FIGS. 1 to 5;

FIG. 7 is a fragmentary sectional view through a modified form of conveyor belt, illustrating the application thereto of a matting which greatly enchances the ability of the conveyor to pick up a thick layer of oil under adverse conditions;

FIG. 8 is a largely diagrammatic view, inside elevation, illustrating here another embodiment of the invention;

FIG. 9 is a side elevational view, again largely in schematic form, illustrating a further modified form of the invention;

FIG. 10 is a fragmentary enlarged view of a portion of FIG. 9, with certain structural members omitted for clarity of illustration;

FIG. 11 is a fragmentary view, partly in elevation and partly in section, showing a means for hanging a second conveyor belt system from a first conveyor belt system;

FIG. 14 is a side elevational view, partly in section, and understood again to be largely schematic in form, illustrating another embodiment of the invention;

FIG. 15 is a plan view showing schematically the case of a floating oil pick-up rig which is self-propelled, and from which extends an oil-carrying hose leading to a barge;

FIG. 16 is a somewhat schematic illustration of the preferred material for surfacing conveyors used in this invention, showing a pair of tufts;

FIG. 17 is a cross-section of a single blade in the tuft shown in FIG. 16;

FIG. 18 is a somewhat schematic and fragmentary bottom (free-end) view of one of the tufts in FIG. 16;

FIG. 19 is a fragmentary side elevation of a portion of an embodiment of the invention;

FIG. 20 is a somewhat schematic side view, partly in cross-section, showing the removal of oil from a conveyor according to the invention;

FIG. 21 is a side elevation of a portion of another embodiment of the invention;

FIG. 22 is an enlarged fragment of a portion of FIG. 9 with a modified surface on both of the conveyors;

FIG. 23 is a top plan view of a catamaran craft carrying three systems according to the invention;

FIG. 24 is a view, facing aft, of part of the system of FIG. 23; and

FIG. 25 is a side view of part of FIG. 9, modified for movement of part of the system relative to the craft which supports it.

DESCRIPTION OF ILLUSTRATIVE EMBODIMENTS

Figure 1:
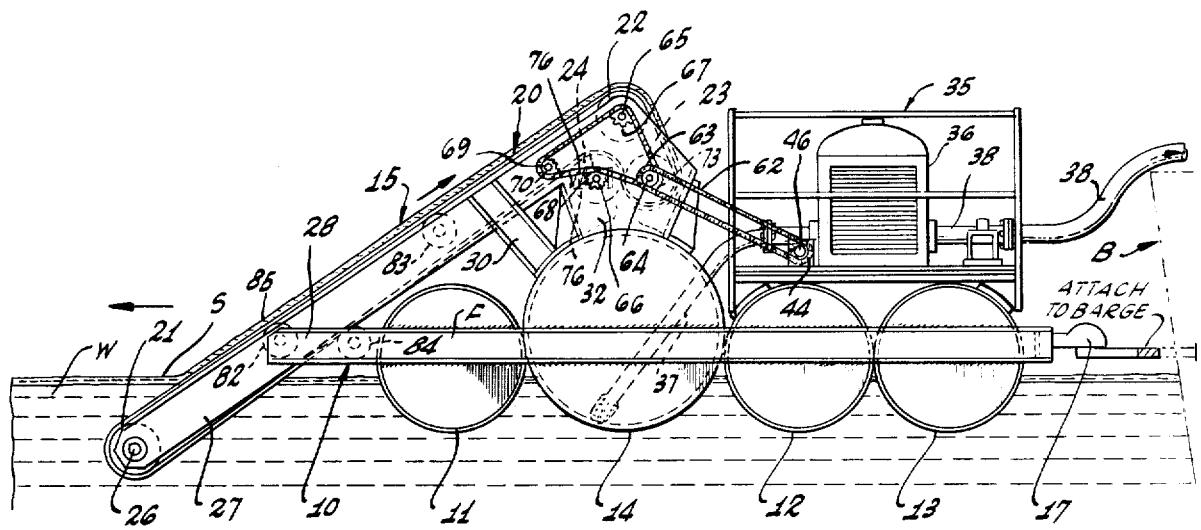
FIG. 1 is a side elevational view of one embodiment of the invention, the drawing being somewhat schematic in nature.
Figure 2:
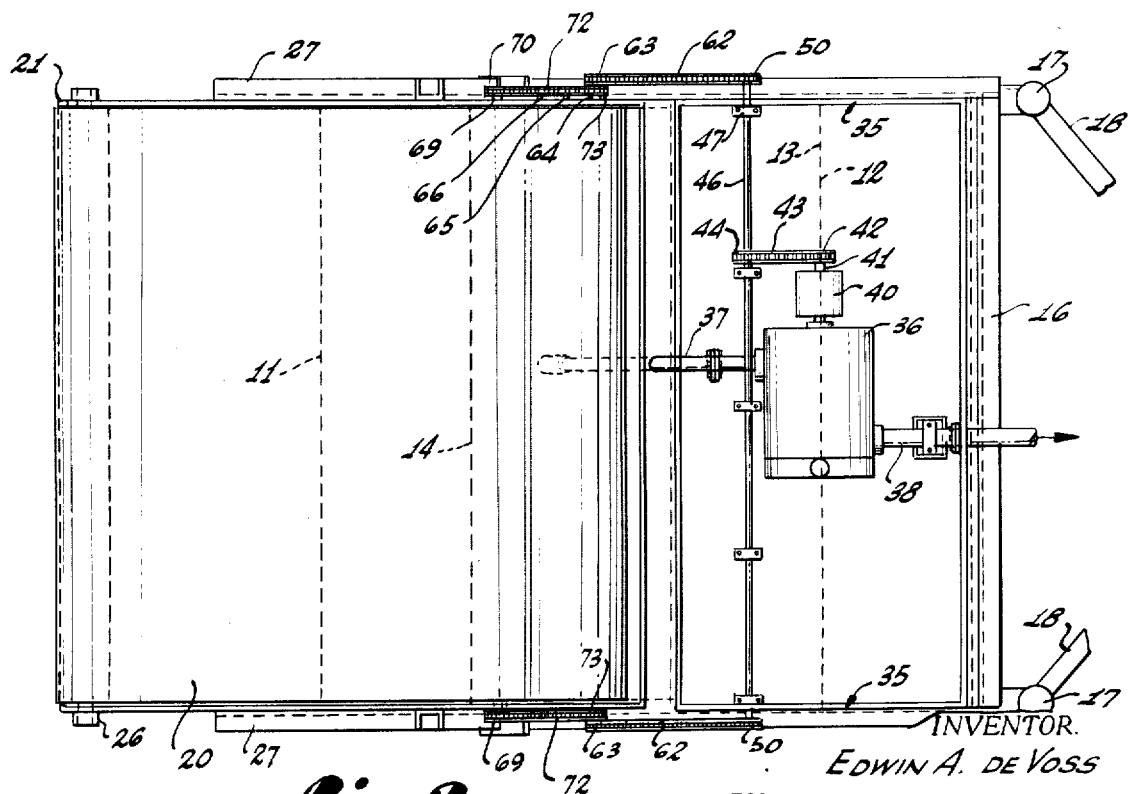
FIG. 2 is a plan view of the apparatus of FIG. 1.

Reference is first made to the embodiment shown in FIGS. 1 to 3, it being noted preliminarily that the drawings are, for simplicity and clarity of disclosure of the essential invention itself, to a large extent in schematic form. Numeral 10 designates generally a float or raft, floating on the surface of the water W by means of hollow air-containing float tanks or drums 11, 12 and 13, the forwardly-located drum 11 being spaced from the two rearward drums 12 and 13 to accommodate a larger drum 14 used to collect oil from the conveyor, generally designated at 15. The drums 11 to 14 are interconnected by longitudinal frame channel beams F, one on each side of the foat, the assembly of drums and beams F being preferably interconnected by welding. Across the rearward end of the float, between the channels F, is a transverse channel 16, and ball and socket fittings 17 connected to this channel 16 have articulated to it two draw-bar links 18 which may extend from the front end of a self-propelled barge, fragmentarily indicated at W, and such as further illustrated in other embodiments of the invention as referred to hereinafter.

The conveyor 15, in this case of the continuous belt type, has a continuous or endless conveyor belt 20 of a width, for example, of the order of 10 to 20 feet, trained to pass or loop around a front and lower guide roller 21 located forwardly of the float 10 and a little below the water level. The upper stretch of this belt extends upwardly from roller 21 on an incline to pass or loop over an upper rearward belt drive roller 22, preferably made of metal with a neoprene cover for traction, mounted directly over the oil collection drum 14, the belt thence extending downwardly to pass around a neoprene wringer roller 23, then between the latter and a neoprene wringer roller 24 paired with it, and finally on an incline back down to the forward roller 21. The forward roller 21 is rotatable on a shaft 26 mounted at opposite ends on inclined conveyor support beams 27, which are supported by the forwardly-projecting portions 28 of beams F and by channel members 30 extending from collection drum 14. Joined with the undersides of the beams 27 are frame members 32, and the shafts for rollers 22, 23 and 24 are mounted in these side frame members 32, as clearly represented in FIG. 1.

The two rearward float drums 12 and 13 support a framework 35 for an engine-driven pump 36, and this pump 36 has an intake hose or pipe 37 reaching into the bottom of oil collection drum 14, and a discharge line 38 leading to a large collection tank, or storage means, preferably an oil barge B which also serves as a means for propelling the apparatus along the water. The engine for pump 36 has a drive shaft leading through a reduction gear set 40 to an output shaft 41 carrying a sprocket 42 driving chain 43 trained over a sprocket at 44 on a transverse shaft 46 mounted near opposite ends in bearings 47 on the framework 35 of the float. Outboard ends of this shaft 46 carry sprockets at 50 over which are trained chains 62 which pass around sprockets at 63 on the shaft 64 for the wringer roller 23. The shaft 65 for roller 22 and the shaft 66 for roller 24 carry sprockets 67 and 68, respectively, and shaft 69 journalled also in frame members 27, forwardly of rollers 22 and 24, carries idler sprockets 70. Chains 72 on opposite sides of the apparatus pass over sprockets at 73 on shaft 64, located adjacent the sprockets 63 (see FIG. 2), thence pass over sprockets 68, 70 and 67, to drive rollers 22 and 23 clockwise, and wringer roller 24 counterclockwise. Conventional means, not shown, may be used to tension the chains, and for spring-mounting the wringer rollers to exert spring-actuated wringer pressure, as suggested diagrammatically at 76 (FIG. 1). The wringer rollers preferably are made with an approximate 12 inch diameter steel tube, covered with a several thick resilient neoprene layer or jacket, and the resiliency of such a neoprene layer permits good wringer action when the rollers are forced into tight engagement, even without a spring-actuated pressure device, though the latter is preferred.

Thus, the conveyor belt rollers 22, 23 and 24 are driven from the pump engine through the described gear, and the rollers 22, 23 and 24 drive the conveyor belt.

Oil on the surface of the conveyor belt is squeezed off by the wringer rollers 23 and 24, and drops at 77, inside through 78 having perforated bottom 79, and thence into collection drum 14 (FIG. 3).

The belt 20 may be, preferably, a conventional wide rubberized belt, preferably nylon reinforced, such as indicated at 80 in FIG. 6. Such belting is readily available presently up to widths of 10 feet, and a belt of this order of width is contemplated in the practice of the invention. This belt is, of course, relatively heavy, and I have accordingly shown, in FIG. 1, the use of supporting rollers 82, 83 and 84, for supporting its upper and lower stretches from below, these rollers being mounted on the framework of the float, for example, as represented in FIG. 1.

A more positive drive for the belt is shown in FIG. 3A, where the belt is molded with gear teeth 83 at each edge to mesh directly with gears such as 84. These gears are placed on the roller shafts, at the ends of the roller drums, and assure non-slip drive of the belt. Another alternative drive for the belt is shown in FIG. 3B, where the belt 20 has riveted to it a link chain C capable of sprocket drive. Such alternate drives are conventional in industry in the driving of large rubberized belts and need not be further described.

In FIG. 1, an oil slick on the surface of the water is designated as S, and as will be appreciated, the float 10 moving on the water toward the left, as by being pushed by the barge, fragmentarily indicated at B, results in inclined upper stretch of the conveyor belt 20 intercepting this slick at a point near the lower end of the belt. The crude oil making up the slick S, unless relatively thin owing to containment of a substantial proportion of volatile gasoline or the like, adheres to the belt and travels up the incline with it in a layer 85. Using a bare rubberized belt, a layer of a half-inch or even greater of the oil can thus be dragged upwardly on the belt. I have observed that under some conditions, a thin film of water may tend to intervene between the belt and the layer of oil at the beginning of the incline, and may thus occasionally hinder initial adhesion, unless the oil is initially reasonably thick or heavy. I have discovered that the lower the incline of the belt, the less will be this hinderance. When the oil is reasonably heavy, as it generally is, and as it becomes in any event following exposure to the sun and the air for a period of say 1 to 3 days, no such problem is encountered, and a thick layer of the oil travels up the smooth-surfaced belt without any difficulty.

The layer of oil thus rises on the belt 20, and passes over the upper roller at 22, then down with the belt around the wringer roller 23, and thereafter between the wringer rollers 23 and 24, where it is removed from the belt by wringer action. This oil thus separates from the belt, and is collected within the drum 14, as previously described. It is thereafter pumped from there to the barge, or other means of reception, as also heretofore indicated.

FIG. 4 is a modification of a portion of the apparatus of FIGS. 1 to 3, showing the use of a scraper to remove the layer of oil from the belt. The belt guiding rollers are the same as in FIGS. 1 to 3, and only wringer rollers 23 and 24 appear in FIG. 4. The wringer action is shown to be employed as before, but there is also used a scraper arm 86, with a scraper edge 87 engaging the belt as it travels under the wringer roller 23, so as to scrape the layer of oil therefrom and cause it to fall as represented at 88. The wringer action of the rollers 23 and 24 is represented in FIG. 4 as functioning to remove whatever oil might pass the scraper, and this then falls as at 89. It is contemplated that the scraper may be used without or without the wringer in practice. As is shown, the scraper arm 86 is pivotally mounted at 90 on a portion of the framework of the apparatus, and is afforded a bellcrank arm 92 acted upon by an adjustable spring 93 under the control of a handwheel 94. With sufficient pressure exerted on the arm 92, a very large fraction of the oil can be scraped from the belt as it travels under roller 23, and the wringer roller 24 thus dispensed with.

FIG. 5 shows another modification, with a simplified arrangement of the wringer rollers, using only two rollers at the upper end of the conveyor in this case. The upper roller may be the roller 22 of FIGS. 1-3, and in this case, the belt wraps more than 180° around this roller 22, and passes between its lower side and the upper side of a wringer roller 96 mounted immediately below. The two rollers 22 and 96 must, of course, turn in opposite directions. Adaptation of the chain drive to the proper driving of the rollers 22 and 96 will be obvious, since the roller 22 can be driven the same as the roller 22 of FIG. 1, and the roller 96 can be driven in reverse direction by affording it with a drive sprocket engaging a stretch of drive chain such as used for the drive of the roller 24 in the embodiment of FIG. 1. The oil traveling up the belt 20 is in this case squeezed from between the two rollers 22 and 96 by wringer action, and falls for collection as represented generally at 97.

The apparatus as so far described may alternatively be provided with a nap on the surface of the conveyor belt designed to enhance greatly the ability of the belt to hold onto the layer of oil. Broadly speaking, I have added to the surface of the belt a loose nap, consisting of fibers, filaments or blades, designed to become entangled into the crude oil and thus to form or provide the surface of the belt with a multiplicity of filaments to which the crude oil may adhere. The best medium I have found for this purpose comprises the so-called long-napped outdoor carpet, now commonly used in place of natural grass for the purpose of athletic fields for sports events such as baseball and football. An excellent material, of this type of great durability, is now in widespread use under the trademark Astroturf.

The artificial grass, in the specific form I have tested and found to have excellent oil-holding properties, has a rubberized textile base 98 (FIG. 7), consisting of interwoven threads with long nap filaments extending upwardly therefrom. The strands making up the nap are looped under the warp of the base, and extend upwardly therefrom, somewhat after the manner of cut nap carpeting of inch-long nap. That is to say, the loops of the strand used to make the nap are cut at the top, leaving two filaments extending upwards from opposite sides of a warp in the base. These filaments are preferably about an inch in length, and are relatively thin and flat. In the product sold as Astroturf, the filaments may be relatively thin, e.g., 0.0035 to 0.004 inch, and flat, a typical width being 0.037 inch. This nap is preferably composed of a plastic material, such as polypropylene, which gives the filaments 99, or, in view of their flatness, their "blades" 99, a substantial degree of elastic stiffness, combined with resiliency. These blades 99 tend to assume a longitudinal curve, and thus intersperse with one another across and above the warf threads so they may appear substantially as represented in FIG. 7. The base 96 of this material is treated with a rubber cement to secure the nap in position, and is in turn vulcanized onto the rubberized belt 20, as represented in FIG. 7.

The blades 99 are resiliently yieldable, but stiff enough to penetrate the layer of oil, and the mat of intertwined blades thus obtains a good adherent hold onto a thick layer of oil, up to double the thickness that can be held by smooth belting alone. The conveyor belt with this overlay of artificial turf is capable of picking up crude oil, or fuel oil, that is still relatively light or thin. The apparatus with this modified, long-napped surface is thus capable of use on freshly spilled oil, before thickening occurs. Fortunately, and somewhat surprisingly, the oil can be wrung (by wringer rolls) from the napped surface substantially as well as from a smooth belt.

The Astroturf product, as presently manufactured, has been found to be ideally suited to my purpose from the standpoint of its oil-holding property, as well as from the standpoint of the ease with which the oil can be wrung from it, and of its resilience or spring-back to its normal orientation after passing through the wringer rollers. It is at the same time manufactured to be tough, long-wearing, and to withstand abuse. Of course, many other materials may be substituted, or under favorable conditions, i.e., where the oil is thick, the conveyor belt can simply be left bare. It is to be understood that it is within the scope of my invention to use the napped tratment of the conveyor surfaces in any of the forms of my conveyor systems, but that, alternatively, in most cases, favorable results can be achieved with reasonably thick oils with smooth-surfaced conveyors, which can thus be used in all embodiments of the invention disclosed herein unless expressly so noted.

Specifically, then the conveyor belt 20 of the rig of FIGS. 1–3 may be bare on its exterior surface, or may have what I describe broadly as a napped surface, which in a preferred specific form has the characteristics of Astroturf, and appears generally as represented in FIG. 7. In FIG. 7 there is shown a rubberized belt 20, and vulcanized thereto, the rubberized base 98 for the relatively stiff, but yieldable, plastic blades 99, curved and interspersed so as to form a loose mat.

With this napped belt treatment, the rig of FIGS. 1–3 has the ability to pick up thinner oil than can a smooth-surfaced belt, and has also the capability of picking up a surprisingly thick layer of oil—substantially double the thickness of the capabilities of a bare belt, which already has the ability to pick up an extraordinary thickness of oil of the heaviness commonly encountered in oil spills.

FIG. 8 shows a modified embodiment of the invention, again using a barge 100 and an auxiliary float 101 pushed thereby with links 102. The float has a plurality of air-filled drums 103, and suitable framework 104 holding these in assembly. The framework 104 includes upper side frames 105 and a rearward projection 106 serving as a mounting for presently-described belt rollers overlying the front end of the barge 100. The links 102 may have ball or other flexible joints enabling relative vertical movement of the float and barge. Inclined belt conveyor beams 100 are mounted on the side frames 105, and support the shafts for lower front belt roller 112 and an upper idler belt roller 113. From roller 112, the belt 114 travels up the incline over idler roller 113 and rearward to roller 115. The belt then passes down and around wringer roller 116, up between the later and ringer roller 117 travelling in the reverse direction of rotation, and thence over an idler roller 118 to return to roller 112. The rollers 115, 116 and 117 are to be understood to have interconnecting sprockets and chains, the same as in FIGS. 1–3, but the drive in this case is from a hydraulic motor 120 mounted on frame member 106 and connected to the shaft for belt roller 116.

The system of FIG. 8 operates much as the system of FIGS. 1–3, but is simplified in that the engine-driven pump is removed from the conveyor float, and the oil collected off the conveyor belt by the wringer rollers falls directly into the barge.

Reference is next directed to FIG. 9, showing a modified embodiment of the invention using belt-type conveyor means, but in this case, showing the use of an inclined conveyor belt whose under surface is utilized to convey the layer of oil. A second conveyor belt is used at an inclined position, the upper stretch of which is parallel to and adjustably spaced below the underneath stretch of the first-mentioned conveyor belt. In FIG. 9, a barge is designated generally at B, and the water line at W, with an oil slick being represented at S, as before. The first upper conveyor is designated generally at 120, and is furnished at its front end, one on each side, with a pair of catamaran-type floats 122. The conveyor 120 has a framework generally designated by the numeral 124 and including a pair of longitudinal, inclined beam members 125 at the opposite edges of inclined conveyor belt 126, idler rollers 127 rotatably mounted on these members 125 supporting the upper stretch of the belt, as clearly represented in FIG. 9. Frame 124 further includes a pair of beam members 129 disposed horizontally and joined to the lower front end portion of the inclined beam members 125. The beam members 129 are mounted on the aforementioned floats 122, with the floats 122 located outside the beam members 125 and 129. Thus, the front end portion of the elevator 120 is supported by the floats 122. At the front lower end of beams 125, and journaled therein, is a shaft 130 for a belt roller 131, and the belt 126, moving down the incline in the direction of the arrow, is looped and travels around this front end roller 131, and then travels rearwardly in a horizontal linear path to a guide roller 132, which is rotatably mounted in the structural junction of beams 129 with inclined conveyor beams 134. As shown, the beams 129 are further braced by frame members 135. It will be understood, of course, that the beams 125, 129, 134, etc., are duplicated at the two edges of the conveyor. The inclined beams 134 are integrated at the top, as by welding, to the underside of the upper end portion of the aforementioned beams 125. The belt 126 travels from the aforementioned guide roller 132 in an inclined path below and spaced a short distance from the conveyor frame members 134, and the arrangement is such that this stretch of the belt goes onto a belt roller 136 near the top of the inclined beam members 125.

The shaft 140 for the last-mentioned belt roller 136 is journaled not only in the inclined conveyor frame beams 125, but also in the arms of cantilever frame structures 142 rigidly mounted on the barge B just outside the conveyor beams 125. It will be clear that the floated portions of the conveyor frame are thus pivotally mounted for rocking action about the axis 140 on frame structure rigidly mounted on the barge. Such rocking action is necessary to accommodate independent floating of the floats 122 and the barge B.

Hung from inclined conveyor frame member 134, by adjustable hangers 144 (see also FIG. 11) are outside longitudinal beam members 150 journalling shafts for lower and upper end rollers 151 and 152 for a conveyor belt 153. Additional idler rollers 154 support the upper stretch of this belt, and idler rollers 155 its lower stretch. The upper stretch of this belt travels upwardly, parallel to and in the same direction as the lower stretch of upper belt 126. To adjust the spacing between the two belts 126 and 153, scres such as 160 are welded to the undersides of the flange of upper conveyor beam 134, and extend into boxes 161 welded to lower conveyor beam 150. Gears 162, here represented as bevel gears, threaded onto screws engage the underside of the upper walls of boxes 161, and are capable of being turned by meshing gears 163 on a shaft 164 journalled in the boxes 161, shaft 164 having on its end a hand wheel 165. Worm and worm sheel, or helical gears, could be used in place of the bevel gears illustrated.

The belt 153 travels up the incline and over the upper roller 152, whose axle is mounted for rotation on beam 150 hung from conveyor 124. It then goes down and around a neoprene wringer roller 166, between said roller 166 and a wringer roller 167 paired therewith, over roller 167, and down the incline to the low, forward roller 151. The shafts for the rollers 166 and 167 are journalled in support plates 150a welded to and depending from the upper end portion of beams 150.

A wringer roller 169 engages upper conveyor roller 136, and its shaft may be rotatably mounted on frame beam 125 in a manner to provide for adjustment of its pressure against roller 136.

The conveyor belts can be driven in any convenient way, but are here represented as driven by roller 136 for belt 126 and by rollers 152, 166 and 167 for belt 153, through a sprocket chain 170 and a system of drive and idler sprockets from a speed controllable hydraulic motor 17, said sprockets and motor also being mounted on plates 150a (FIGS. 9 and 10). The shafts for the several sprockets and for the rollers may thus all be journalled in the plates 150a integrated with the beams 150. One of the idler sprockets can, if desired, be provided with capability for spring-actuated movement to tension the chain in a conventional manner. It will be understood that the drive chain and sprockets seen in FIGS. 9 and 10 will be duplicated, one on each side of the conveyor, both being driven by the shaft of the hydraulic motor 171.

The system of FIGS. 9–11 performs as follows:

The two conveyors are driven, and a barge B is propelled by the self-propulsion system of the barge, normally an engine and propeller, in the direction of the oil slick S, or along an edge thereof, so as to overlap and pick up a strip between about 10 to 20 feet wide at the edge thereof. The upper conveyor belt 126, after passing down and substantially around the nose roller 131, engages the top of the floating oil slick. Its bottom stretch may float at a level just under the top surface of the slick, or may just contact that surface. Owing to the forward progression of the rig, the underside of the belt literally rides over and upon the layer of oil, making instant adherent contact with the slick in either case. Thus, as the belt tilts upward, beyond the guide roller 132, it is in full face-to-face adherent contact with the oil, and a relatively thick layer of the oil will cling to the underside of the inclined stretch of the belt. Even the thinner freshly spilled oils ride up to the incline belt very well, as in this case there is no problem with an intervening film of water. The thickness of the layer that can be hauled up is increased in all cases by the use of the napped surface on the belt. If the thickness of the slick is relatively great (it may sometimes go up to 3 inches in thickness), the conveyor belts can simply be driven at greater speed by the drive motor, which for this purpose preferably has a variable speed range, capable of producing belt travel velocity substantially above the velocity of the rig through the water. The oil thus is dragged from the slick at a rate faster than the rate of propulsion of the rig through the water, and, for example, if the slick is 3 inches thick, a three-fold increase in belt speed will take substantially a one-inch layer of oil up the conveyor belt. This layer of oil is squeezed from the belt by wringer roller 169, and descends in a stream as at $st$ (FIG. 10).

The lower belt is useful in several ways. It can be adjusted in spacing from the top belt so that the layer of oil hauled upwards will bridge the gap between the belts as represented in FIG. 11. This permits the pick up of a very thick layer of oil, especially if both belts are surfaced with the earlier-described nap.

In some cases, the lower belt functions primarily just to catch chunks of oil which may happen to fall off the underside of the upper conveyor. In still other cases, the lower belt may pick up its own layer of oil from any which remains in the water after the upper layer carries away its maximum load. In this case, of course, each belt will haul up a layer of oil, but there may be a spacing distance between the two layers. Oil clinging to the belt 153 is wrung or expressed therefrom by wringer roller 167, and falls with that wrung off the belt 126 by roller 169.

The two-belt system has the additional advantage that intervening oil is guarded against being washed away by splash from waves. Note may also be taken of the fact that as described, both conveyors are connected together by hangers, such as designated at 144, and the assembly then pivotally connected to the barge at pivot axis for vertical motion independent of that of the barge. It will be seen that either conveyor could be so pivoted to the barge, and for example, if the lower conveyor were chosen, it could be pivotally connected to support structure on the barge such as 142 by means of the shafts for any one of the shafts for rollers 152, 166 or 167. In such case, the mounting of the shaft upper conveyor roller on barge structure 142 would be omitted. In either case, as will be clear, adequate support strength and rigidity must be built into or along with the adjustable hangers 144, it being recognized that the present drawings are in more or less schematic form.

It should be here pointed out that the system of FIG. 9 shows the case of one self-propelled buoyant carrier mounting a conveyor. The carrier can be a barge, as suggested, but the system is representative of any self-propelled, buoyant vehicular means carrying a conveyor, which may be of large scale, as a barge or tug, or may be of small scale, e.g., a propelled float or raft, such as the floated rig of FIG. 1, decoupled from the barge there shown, and understood to be capable of propulsion, as by use of an auxiliary outboard motor, a paddle wheel, or the like. In such case, the float or raft would, of course, not retain its collected oil as in the case of FIG. 9, but would pump it via a hose, either to a barge, or ashore. The hose in this case is preferably of a buoyant type, now available; or may be supported by floats. The small buoyant raft or rig thus can propel itself about readily, to make short runs, for clean up of small or irregular areas, with maximum facility for such conditions (see FIG. 15).

Figure 12:
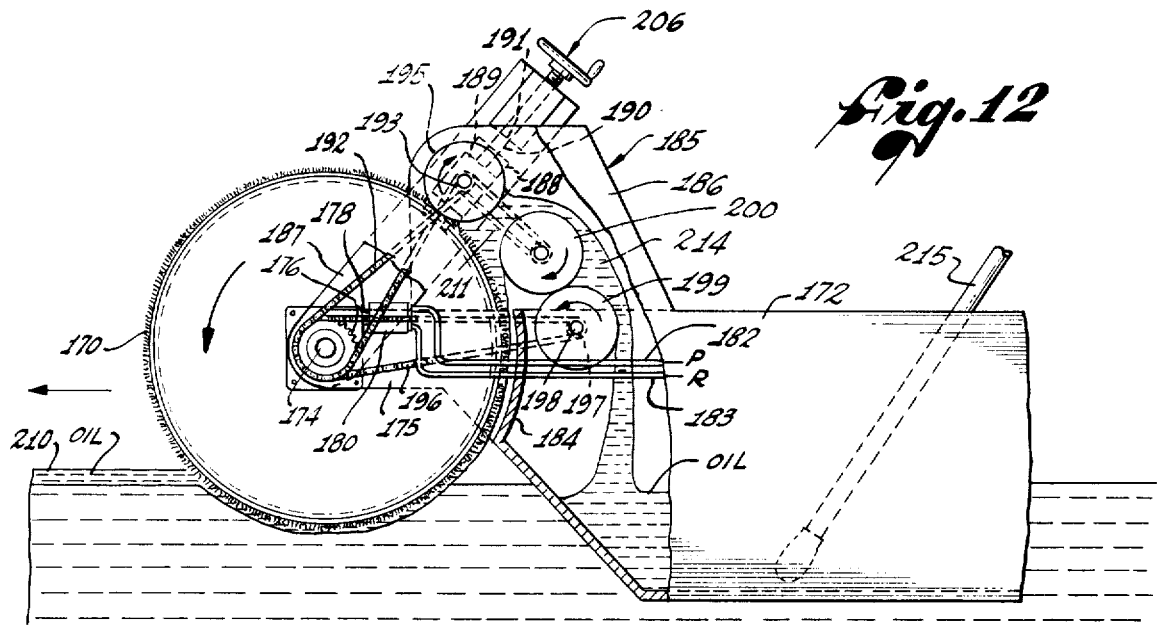
FIG. 12 is a side elevational view, partly in section, showing a conveyor drum type of system.

FIG. 12 shows, largely diagrammatically, a modification of the invention using a wide, rotatable metal drum 170 for the conveyor, instead of an endless belt. The width of the drum is comparable with that of the belt in the belt types. The peripheral surface of the drum is again a continuous, endless conveyor surface, closing on itself. The periphery of the drum may be bare metal, but is improved by use of the previously-described napped surface, preferably, as before, of the nature of the plastic artificial grass manufactured under the trademark Astroturf. Such a surface is indicated on the drum 170 of FIG. 12.

The buoyant floating vehicular means 172 carrying the rotatable conveyor drum is shown only partially in FIG. 12, and may be a barge, equipped as usual with engine and propeller, not shown, or may be a small conveyor carrier craft, with or without self-propulsion means.

If without self-propulsion, it may be coupled to and pushed by a barge, as in FIG. 1.

As represented, the drum 170 has an axle 174 mounted between two spaced beams 175 projecting forwardly from the buoyant, floating conveyor carrier 172. Mounted on one of the spaced beams 175 in a gear case, in which is a helical ring gear, not shown, tightly mounted on axle 174, and driven through a helical pinion, not shown, on a shaft 178, the prime mover being a hydraulic motor 180 mounted also on the same beam 175. The motor has pressure and return lines 182 and 183 leading through suitable control valve means from a source of hydraulic fluid under pressure, and a return, these members not being shown since such equipment for the drive and control of hydraulic motors is well known.

The front end of the barge has a concave wall 184 spaced a short distance from the periphery of the drum, so as to define a passage and furnish clearance for a layer of oil on the periphery of the drum, which in this case turns counterclockwise as viewed in FIG. 12.

The front end of the barge has frame structure generally indicated at 185, including two spaced side walls 186, and, as here shown, inclined beams 187 rise from beams 175, one on each side, and are joined to the walls 185. The beams 187 have ways 188 for slide blocks 189 which can be moved longitudinally of the beams 187 by a lead screw 190 threaded in walls 191 of each of beams 187 and provided with a hand wheel 206, for adjustment of wringer pressure. Shaft 174 has a pair of side-by-side sprocket wheels, one pair outside each end of the drum 170, and one on each side is connected by a crossed chain 192 to a sprocket 193 on the shaft of a rubber wringer roller 195 journalled in slide block 189. The other sprocket on shaft 174, at each end of the drum, is connected by a chain 196 to a sprocket 197 on a roller shaft 198 mounted for rotation on frame 185. This shaft 198 carries a rubber wringer roller 199, spaced rearwardly from barge end wall 184. The roller 199 engages, with moderate pressural contact, a rubber wringer roller 200 immediately above. Roller 200 can be driven from roller 199 by friction, or by chain and sprocket from the shaft of wringer roller 195.

The rig of FIG. 12 operates with the conveyor drum turning counterclockwise, as seen in FIG. 12, as the craft is propelled toward the left. The turning drum 170, which may dip into the water approximately one-sixth of its diameter, encounters the oil slick 210 on the water, depresses it, whence it comes into intimate adherent contact with the drum; and a thick layer of the oil is dragged along with the turning surface of drum, down and around, and to the rising backside of the drum, and finally into the angle between the drum 170 and the wringer roller 195. The oil can be thus wrung relatively free and clear of the drum, even when the artificial grass surface matting is used. The separated oil tends to accumulate in the region 211, is helped to flow outward by drag produced by the roller 200, and forms a stream 214 which runs down into the barge, The oil can be pumped from the barge via a hose 215. As mentioned earlier, the conveyor drum 170 can be used bare-surfaced, or surfaced with a napped mat. In the latter case, a much thicker layer of oil can be elevated by the drum, and it is generally desired.

Figure 13:
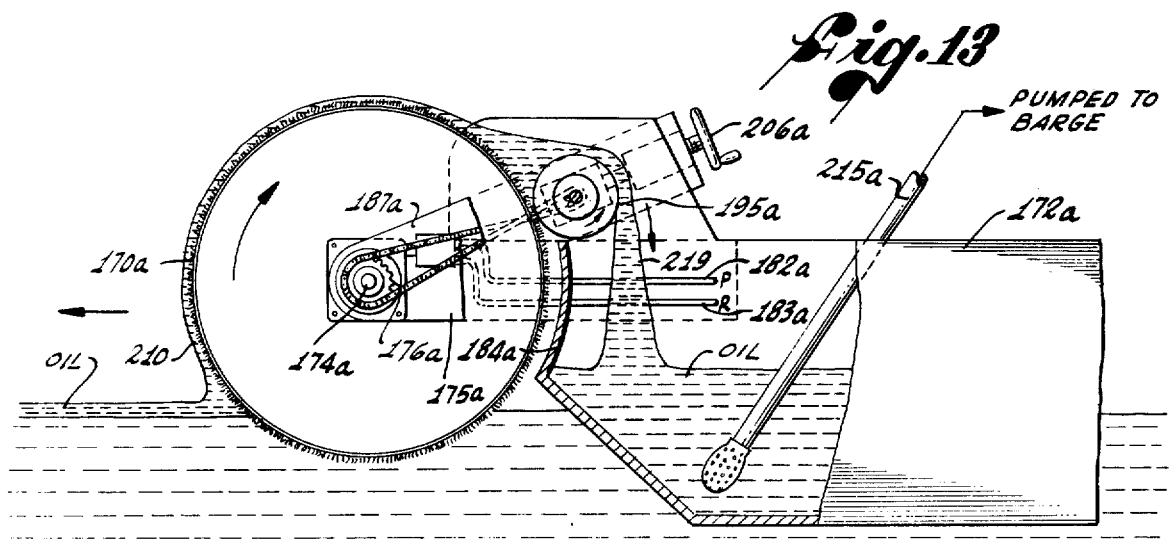
FIG. 13 is a view similar to FIG. 12, but showing a modification.

FIG. 13 shows a modification of FIG. 12, with many components similar. Accordingly, parts in FIG. 13 similar to parts in FIG. 12 will bear the same reference numerals, but with a suffix $a$ added in the case of FIG. 13, and corresponding parts will not be re-described. The essential difference in FIG. 13 is that the conveyor drum is driven in the reverse direction, clockwise as seen in the figure. Also, the rollers 199 and 200 are omitted.

The embodiment of FIG. 13 preferably utilizes the napped mat on the surface of the conveyor drum in order to pick up the oil slick to good satisfaction. The bare-surfaced drum in this case, with its overhanging, curved, incline, where the oil layer is first encountered and lift is attempted, may fail to make a satisfactory adherent contact with the drum surface, apparently owing to a film of intervening water. With the napped mat, a good hold on a substantial layer of oil is immediately secured, and such a layer will ride up, around over the top, and to the wringer roller 195a. It should not, however, be concluded that the drum type conveyor of the class of FIG. 13 cannot be used with a bare-surfaced drum, because it can. However, the modified design can favorably improve the performance. It is evident that as the drum is positioned lower in the water, for example, say to a depth such that only an upper portion of the drum emerges, e.g., 25% of its diameter, the incline is reduced to such an extent that moderately light oil can cling thereto.

In the case of FIG. 13, the oil clinging to the drum surface is separated and expressed by the wringer roller and flows over the latter in a stream 219 which then descends into the barge.

FIG. 14 shows a further modification, showing in combination, a drum type conveyor 220, and a belt type conveyor 221, floated on a raft 222 having catamaran type floats 233 inboard of the side edges of the conveyors. The raft will be understood to include interior frame structure, indicated at 234, between two parallel catamaran floats 233, which not only connect the floats but support the conveyors on the floats, as well as carrying a pump 225 for hydraulic fluid fed to conveyor motors 236 and 237. The raft 222 floats on the water W, on which is oil slick S, and is propelled (pushed) forwardly by a self-propelled Barge fragmentarily indicated at 240.

Draw bars 242, trunnioned to the sides of the raft at 244, are connected at their rearward ends, by ball and socket joints 246, to gibbed slide blocks 247, understood to be spaced horizontally. The slide blocks 247 are vertically adjustable on lead screws 250 journalled in bearings on the front end of the barge. The lead screws are rotatable by hand wheels 252 for adjustment of the slide blocks 247 to an elevation comparable with that of the trunnions 244.

On the frame structure of the raft is erected a fulcrum structure 254, on which is fulcrummed, at 255, a pair of parallel, inclined, side beams 256 for the rectangular frame of the aforementioned belt conveyor 221. Belt rollers 260 and 261 for the front-lower and rear-upper ends, respectively, of the endless conveyor belt 264, are mounted on shafts 265 and 266 journalled in the ends of inclined frame members 256. Roller 261 is drive roller, and, in common with all the belt drive rollers, may be of bare metal, which may be covered with a layer of neoprene for traction. The roller 260 is an idler, and can be bare metal.

The hydraulic motor 237 for conveyor 221 may be mounted on one of the inclined longitudinal beams 256, adjacent the upper belt roller 261, and will be understood to drive a pinion and ring gear set housed in ring gear case 270. The ring gear drives shaft 266, and thus the drive roller for the belt.

A wringer roller 272 engages the underside of the belt going under belt drive roller 261, its shaft being mounted in slide locks 274 which are adjustable in position by a lead screw 275 and hand wheel 276, according to conventional practice. The roller 272 may be made of rubber, preferably neoprene, and is adjusted for pressural engagement with the roller 261 to wring the layer of oil 277 from the belt 264. The oil thus wrung from the conveyor belt descends in a stream 278, down into the barge 240.

The primary feature of the modification is the auxiliary drum conveyor 220, functioning as an additional pick up for the conveyor belt 264. Drum 220 is rotated by a hydraulic motor 236 mounted on a frame structure 280 erected from the side frame members 256 of conveyor 221. Hydraulic motor 236 mounted on frame structure 280 journals the conveyor drum 220, as at 282, and a ring gear housing 283 contains a pinion and ring gear driven from the shaft motor 236. Motor 236 is fed by a pressure fluid line 284 leading via a control valve 285 from the aforementioned hydraulic pump 225, and a return line 286 is furnished, as in any such hydraulic system. In similar fashion, the hydraulic motor 237 for the driver of conveyor belt 264 has a pressure fluid supply line 288 fed through control valve 289 from the aforementioned hydraulic pump 225, and a return line 290 is provided, as in conventional practice.

In operation, pick-up drum 220 is, of course, hollow, and aids in floating the forward end of the conveyor. The front end of the belt conveyor preferably dips below the water level. The drum is driven in counterclockwise direction, as viewed in FIG. 14, by hydraulic motor 236. The drum 220 picks up the oil slick, as in FIG. 12, and elevates it to a position over the inclined conveyor belt 277. It is there removed by wringer roller 294 whose shaft is journalled in slide block 295, positioned by lead screw and hand wheel assembly 296. The wringer roller 294 is of a resilient rubber-like material, preferably, neoprene, and is capable of separating the oil from drum 220, whether the latter be bare metal or covered with my artificial grass matting surface, which is preferably used.

Thus, in normal operation, the oil slick is lifted a short distance by the rotating conveyor drum, and is then separated therefrom by the wringer roll 294, falling in a stream 300 onto the upwardly travelling conveyor belt, on which it forms the layer 277 described earlier. The conveyor mechanism will be seen to be floated partly by the drum 220 and partly by the catamaran floats 233, and the pivot joint at fulcrum 255 permits pivoting as these fall or rise relative to one another.

When the oil slick S is thick, not all of it will in all cases be picked up by the roller 220. In this case, as the rig progresses forwardly through the water, the portion of the slick not picked up by the drum encounters the belt 277, and is picked up thereby. Thus, in this case, the belt is helped by the pick-up drum, which lifts some of the oil, and drops on the conveyor belt above the water line, while the conveyor belt itself is picking up the remainder by encounter with the slick under the drum. The pick-up capacity of the system is thus improved in the difficult region, where it is still in contact with the water, and the full oil transporting capability of the belt may thus be more nearly approached by the pick-up ability of the system.

FIG. 15 is a diagrammatic plan view of a self-propelled floating conveyor rig 310, built on the general principle of the rig of FIGS. 1-3, for example, but which is designed to make oil collecting excursions independently of the barge B. The oil line 311 from rig 310 to the barge B may be, for example, several hundred feet in length, and may be of a buoyant type now commercially available, or may otherwise be provided with floats.

FIGS. 16-18 constitute an effort more meaningfully to illustrate the construction of the preferred conveyor surface 299 for the conveyors used in oil recovery systems according to this invention. As previously stated, this preferred surface is composed of a large number of blades which are limber and substantially flat. Such a conveyor surface is commonly formed by using a base 300 (which may be a belt-like structure for use as a belt, or a sleeve for a drum) to which a large number of tufts 301 is attached, of which only two are shown in FIG. 16. They are disposed in a rectangular pattern on the base, and are close enough to each other that at least toward the free ends of the blades, they give side support to one another without, however, compressing the tufts so tightly as to exclude oil therefrom. Each tuft consists of a bundle of individual blades 302, and the tufts are formed by drawing the respective bundle of blades through the base as a tuft to form a "U" shape rather like a staple. The free ends will form the blades.

A common construction is one where there are 24 tufts per square inch of base, and in which each tuft includes 14 strands, potentially forming 28 blades. Each blade is about ¾ inch long, 0.028 inch wide, and 0.002 inch thick. These blades are thinner than those shown in FIG. 7, and are, therefore, not as stiff. However, they do have a normal shape to which they tend to return in the absence of deforming forces. It is common for the tufts to receive a twist when formed, and therefore the blades may initially have a somewhat spiral form which, after some usage, tends to disappear, and the blades tend to straighten out toward a flatter shape.

Because a surface formed with 28 blades per tuft may be too dense for the heavier oils to penetrate in a reasonable residence period, one "arm" 304 of the U can be sheared off near the base, and the total number of blades is therefore reduced by about one-half. The total effective blade area is somewhat more than one-half, because a small part of the cut-off arm remains near the base. The total theoretically available surface area of the blades for contact with oil will be about 30 square inches per inch of base. Because the blades are bunched together near the base, the effective area is reduced to about 26 square inches of blade per square inch of base because of the closeness of the blades next to the base. Because the oil is primarily held to the conveyor by surface adhesion (or adsorption) of the oil to the surfaces of the blades, and by internal adhesion within itself, this increased surface area per square inch of conveyor surface greatly improves the oil-collecting capacity of a square inch of conveyor surface. Furthermore, because the blades have a dimension of length that extends away from the base, they provide a means for holding a thicker layer of oil than would adhere to a smooth surface of the same material, because the slick will "stack up" along the extended blades, instead of merely attaching itself in a layer of minimum thickness to a smooth surface, such as the surface of a smooth rubber belt.

As can best be seen in FIG. 17, each blade has a dimension of length L, of width W, and of thickness T, as aforesaid. As best shown in FIG. 18, because of the construction of the arms of the tufts, channels 305 will be formed between adjacent tufts, into which the oil can pass. The blades extend generally parallel to each other, but in use they may become somewhat entangled with one another, and of course, they do not lay uniformly parallel to one another. Generally, they will leave a large number of these channels between them so that oil can readily penetrate toward the base and adhere to the maximum possible area of the individual blades. The material of FIG. 7 also forms channels, but they may not be as deep as those formed by a construction with the same blade length, and where the blades are straight rather than inherently curved.

The material used for the blades is that described above for Astroturf. Oil will removably adhere to it in the sense that it tends to attach itself somehow to the blades, and can be removed as a gross body by wiping or wringing. A thin film will ordinarily remain on the surface of the blades after the wringing action, but the major oil body will be removed.

FIG. 20 shows surface 299 being cleansed of oil 306 which has been picked up by surface 299. The conveyor belt is passed between a pair of wringer wheels 307, 308, which tend to keep the oil on the input side, and which tend to remove it from the individual blades by a combination of wiping, squeezing, and wringing action. Blades ahead of the wringer wheels hold the oil slick as a consequence of the adherence between the oil and the material of the blades. After the oil is removed, the blades tend to move back toward the position illustrated past and above the wringer wheels in FIG. 20.

FIG. 20 is somewhat oversimplified because the blades are sufficiently limber that they do not quickly tend to spring back individually to any particular position. These blades are not stiffly flexible in the sense of a brush bristle, and they do not "flick" back into position. However, the tufted construction tends to cause the blades to rise as a tuft after being cleansed, and the blades as a group give side support to one another. Because of the thinness and limberness of the blades, they can readily be pressed flat against each other and against the base as a group so as to be reduced to least practical volume and to enable the maximum amount of oil to be squeezed out. The same consideration of pressing flat against each other, and as a group to be pressed against the base, applying to the material shown in FIG. 7.

As can be seen in FIG. 19, it is common practice for conveyor surface 299 to be bent around a roller 309, which tends to separate and space apart the tufts and the blades before they enter oil slick 310. Still, when they contact the oil, the tufts generally project toward and into it.

FIG. 19 is intended to constitute a more generalized showing of parts of FIGS. 9 and 25. Conveyor roller 309 may be attached to any desired structure, and support wheels 310, 311 give rolling support to conveyor 312 to hold it down against the oil slick. The conveyor can constitute that shown in either of FIGS. 9 or 25. It shares with these other constructions a downwardly-facing region 313 which faces toward the surface of the water from which an oil slick is to be removed. The motion of the conveyor is shown by arrows 314, while the motion of the entire device through the water is shown by arrows 315. A bow wave 316 will be formed ahead of the device, but will not be of sufficient magnitude as to drive the oil slick away from the device. The downwardly-facing region has a substantial dimension of length in the direction of forward motion. A length of the order of a few feet is quite satisfactory, but it need not be that great, and can be greater. In all embodiments, there is a lateral dimension of width of the conveyor as shown in FIG. 2.

As is best shown in FIG. 19, the downwardly-facing region need not be parallel to the water and, in fact, may slightly depress the oil slick beneath what would otherwise be the free surface of the water. However, the movement of the oil when in contact with the conveyor is not intended to be primarily downward, but primarily rearward and upward. Excessive submersion of the slick should be avoided, because of the risk of breaking up the slick under water and letting some of it get past the device. The purpose of the downwardly-facing region is to provide a substantial area of contact between the conveyor surface and the oil slick for a sufficient period of time to permit the oil to penetrate into the tufts and adhere to the surface of the blades. Accordingly, as the device moves through the water, as shown by arrows 315, the motion 314 will be coordinated with it so that sufficient residence time of the individual blades in the oil slick elapses for this purpose. When the oil is very thick and viscous, a somewhat longer residence time may be required than when the oil is relatively thin and can more readily penetrate into the tufts. Accordingly, it will usually be found that for the thicker slicks, the linear speed of the conveyor surface at its point of contact will be on the same order of magnitude as the velocity of forward motion, while with the thinner oils, it may even be more rapid, although these ratios can be changed to suit various conditions as they occur.

FIG. 21 shows a conveyor surface 299 attached to a drum 320 and moving in substantially the same way as the downwardly-facing region 313. The distinction between the drum construction and the conveyor belt construction of FIG. 19 is that the length in the forward direction of downwardly-facing region 321 in FIG. 21 is a function of the diameter of the drum and of its depth in the water, while in FIG. 19, it is a function of the spacing-apart of the support rollers. In every case herein the term "conveyor" is intended to connote both a linearly-extending belt of the type shown in FIG. 19, and drums such as shown in FIG. 21, both of which may be surfaced with the same types of material. Accordingly, regions 313 and 321 are both intended to connote downwardly-facing regions. Both operate relative to the surface of a body of water 322 having an oil slick 323 atop it. In both embodiments, the movement of the oil is primarily rearward and in the device of FIG. 21 upward, and the diameter and elevation of the drum will be selected so that the submerged portion meets this criterion.

FIGS. 22 and 25 are extensions of the disclosure of FIG. 9, but for convenience, bear their own numbers. In FIGS. 22 and 25, a conveyor 325 is shown which is faced with the preferred conveyor surface 299. Surface 299 is shown being passed around guide rollers 326, 327 and will be driven as in FIG. 9 as shown by arrows 328. The velocity of the device through the water is to the left in FIG. 25. The conveyor is hinged by hinge pins 330 to a support vehicle or vessel 331, such as a barge, and extends forwardly thereof. A secondary conveyor 335 is placed aft of the conveyor 325.

Conveyor 325 has a stretch 336, and secondary conveyor 335 has a stretch 337, which are individually supported so as to be substantially parallel to each other and spaced from each other by a spacing S. The dimension of the spacing is selected as a function of the viscosity and thickness of the oil slick.

A downwardly-facing region 338, such as region 313 of FIG. 19, is provided and is supported by a hinged beam on a float 339 at such a position that the material of the region will be pressed down onto the surface of the oil slick 340 atop water 341. Therefore, as the vehicle moves forwardly through the water, the forward portion of conveyor 325 can rise and fall relative to the vessel to conform to the wave motion and maintain the downwardly-facing region on the oil slick. FIG. 19 illustrates that the downwardly-facing region need not be horizontal, but may be somewhat inclined, if desired, and FIG. 21 illustrates that it need not be flat. However, the primary movement of the oil slick is rearward and upward, and excessive submersion of it is to be discouraged. The intended purpose is to press the surface of the conveyor against and into the oil slick to increase its penetration from the top. In both cases, the belt or the drum will have a forwardly-extending, rearwardly-moving, downwardly-facing face, which face has a substantial dimension of length along the axis of forward movement of the craft to which it is mounted. The region and blades are disposed so as to overhang and press against and into the oil slick for adherence by the oil.

FIG. 22 is a fragment of FIG. 25, but is intended more fully to illustrate a feature of FIGS. 9, 14, 21, 22 and 25. In these embodiments, there is used either a pair of conveyor belts or a forward conveyor comprising a drum and a rearward, upwardly-inclined belt. The two belts, or the drum and the belt, form an initially wedge-shaped path at the level of the oil slick. The belts, or the drum and the belt, move in such manner as to draw the oil along the path from the initial wedge. For example, in FIG. 22, conveyors 325 and 335 are generally parallel and spaced apart by the spacing S beyond guide rollers 327 and 342. The secondary conveyor extends below the elevation of conveyor 325 so as to form an initially wedge-shaped path 343 between them. The relative motions of the two conveyors in FIGS. 22 and 25 are such as to draw oil which becomes entrapped into and through this initially wedge-shaped path into the spacing S between them. Of course, the primary adhesion will be between the oil slick and conveyor 325. However, in the event that the properties of the slick and the conveyor are such as to permit a partial drainage of the oil from conveyor 325, it will be caught and carried by the secondary conveyor. Similarly, should the volume of the oil slick exceed that which can readily be picked up by the conveyor 325, it will be trapped in the wedge-shaped path and picked up by the secondary conveyor. This initially wedge-shaped path therefore provides an important supplementary means for picking up excessive oil slick in excess of the capacity of the primary conveyor 325 and also to catch the drainage therefrom, should there be any. Both conveyors are subsequently passed through wringers to remove the oil, for example, in the manner described in FIG. 9.

The use of a pair of conveyor belts is illustrated in FIGS. 22 and 25, while a wedge-shaped path 343, formed between a drum 320 and a secondary conveyor 344, is shown in FIG. 21. In FIG. 21, a wringer roller 345 is shown removing the oil slick from the surface of the drum and depositing it on the secondary conveyor, along with the material already collected by the secondary collector from the initially wedge-shaped path, after which this oil is removed from the secondary conveyor.

The embodiments of FIGS. 1–22 and 25 as shown are relatively heavy and bulky and mounted to relatively large vessels or vehicles. An advantage of this invention is that it can, if desired, be scaled down for use on relatively smaller vessels or vehicles, and can be flexible enough for use in rough water. For example, in FIG. 23, there is shown a catamaran vessel with a pair of catamaran hulls 350, 351 having three recovery systems 352, 353, 354, according to any of the above embodiments, mounted to the hulls. For example, in FIG. 24, one of the hulls 351 is shown floating atop the surface of a body of water 355, and supporting one of the recovery systems bearing conveyor surface 299. It may be powered through a transmission 356 which also includes a hinge 357 that supports the system in such a manner as to permit it to rise and fall along arc 358 according to wave motion. The recovery systems may be made sufficiently buoyant that they ride atop the surface of the water. A pair of external supports 359, 360 are provided as outer hinge blocks, to which cables 361, 362, 363 and 364 are attached to give lateral and forward-aft support, but to permit the rise and fall as heretofore stated. Propulsion means 365, 366 is provided for driving the craft through the water. The craft as illustrated may also be provided with forwardly-pivoted devices such as shown in FIG. 25, thereby providing full flexibility around all necessary axes of relative movement so that the craft may be used in rough water.

In fact, one significant advantage of the invention over the prior art resides in the fact that it can be used in rough water. The region where contact is made between the conveyor and the oil slick is, when the downwardly-facing region is provided, relatively quiescent as between the two so that the oil pick-up operation is unimpeded by weather and surface conditions. This is especially true as contrasted with conveyors wherein the entire oil slick is attempted to be picked up by bringing a conveyor up from underneath the slick, for example, as in FIG. 1, where the conveyor itself might be lifted totally out of the water from time to time as a consequence of rough wave motion. The usage of a downwardly-facing region makes the system much more adaptable to usage in rough water. The top oil-covered surface of the water conforms to the downwardly-facing surface of the conveyor, riding over it.

The term "removable adherence" of oil to the surface of the blades does not necessarily mean a complete cleaning of the oil from the surface of the blades, but rather the ready removal of all but perhaps a thin film of oil.

It is to be noted that the present system of collecting oil slicks from water does not exclude the use of loose scattered straw. While such straw should not be necessary with my system, my conveyors can pick up the oil-laden straw if straw has been used.

My system, employing the so-called artificial grass of either of FIGS. 7 or 16, is capable of picking up relatively thin freshly-spilled fuel or crude oil as well as aged oil. The artifical grass is considered an important feature of the invention, considering its remarkable oil-holding capacity, as well as its equally remarkable ability to give up the oil under wringer action. It should be considered that fuel or crude oil, upon exposure to the sun and weather for a time, becomes extremely thick, viscous and sticky, and holds to anything it touches with surprising tenacity. Nevertheless, it can be wrung free from the artificial grass with comparative ease. The oil sticks to the conveyor belt or drum in a thick layer, and is separated from the water by elevating the belt or drum after making contact with the oil slick. The thin film of water that wets the underside of the oil slick is squeezed out as the heavy oil adheres progressively to the conveyor surface. The oil slick can be picked up and elevated in thick, wide strips, and at a recovery rate which to my knowledge has not been heretofore approached.

A feature of the oil collection process of the invention is to vary the velocity of travel of the rig in the water in accordance with the thickness of the oil slick, speeding up when the slick is thin, and slowing down when the slick is thick, so that an optimum load is carried by the conveyor at all times. Also, the conveyor, belt or drum, can be speeded up when the slick is especially thick, so that the linear velocity of the conveyor is thus greater than that of the rig. Thus, if the conveyor can pick up a 1 inch thick layer of slick at a given velocity through the water, a three-fold increase in conveyor velocity can accommodate substantially to a 3 inch thick layer of oil, carrying a 1 inch thick layer, but at 3 times the surface rate of travel.

The blades of the conveyor surfaces described herein undergo several important physical reactions between themselves and the oil slick. In order to understand these, one should be aware that the blades are made of a material which is wetted by the oil (polypropylene is only a single example of a wide range of substances which will be wetted by the oil), and that the oil to be picked up in commercial operations can vary widely in its physical properties.

Jet-engine fuel and fresh crude oil are not especially viscous. Fresh crude oil contains considerable gasoline which thins it. Slicks of these materials can be cleaned up with the device of this invention.

As crude oil is weathered, it loses its lighter fractions, and some of it oxidizes, and it forms a very viscous layer which is resistant to penetration. Similarly, bunker fuel "C" and "No. 6", which are frequently spilled, are initially quite viscous, and become more so after extended exposure to the sun. Such material can also be picked up by the devices according to this invention.

Experimentation with single blades of the material of FIG. 16 shows that the blade tends to bend when directly pressed against the exposed surface of an oil spill when the viscosity is appreciably greater than that of SAE 40 motor oil at room temperature. However, given time it will penetrate, be wetted, and can be withdrawn with a finger of oil on it. The problem is that the time required may be too long. That is why, with the material of FIG. 7, there is somewhat more inherent blade stiffness and provided somewhat less density of blade material, and in the material of FIG. 16, there is less blade stiffness and more side support. However, both embodiments are limber enough readily to be flattened against one another (of course, they will not lay in neat piles, and this terminology is not meant to connote such a condition), but generally the blades will pack flat against each other, and as a group against the base so as to occupy a near-minimum volume during the wringing action so maximum quantities of oil are removed.

The side support offered in both embodiments by the neighboring blades, one to the other, tends to keep the blades pointed into the oil and speeds the insertion of the blades into it. This side support occurs, of course, primarily when an endwise force is exerted on the blades, for example, when the surface is pressed against a slick. Theoretically, the blades could all be spaced from one another in the absence of these forces, although this will not be the practical case. When the endwise force is exerted on the blades or tufts, they will tend initially to bend or slump, at least in viscous slicks. That is when the side support primarily occurs, because they will slump against and support each other as blades and as tufts. For example, a crude oil slick exposed to air and sunshine for 21 days will initially be indented by an individual tuft, but within a short and completely acceptable period of time, the blades will enter the oil, and the oil will have flowed into the spacings between the blades.

In selecting the density of the blades, on may use as a guide the consideration that the total spacings between the blades ought to average out not much more than 0.020–0.030 inch. This will enable the lightest oils expected to be picked up to bridge between adjacent blades.

It is emphasized that in FIG. 20, the tufts have been reduced to schematic, spaced-apart single bodies. This is a schematic simplification of FIG. 16 in order better to show the wringing action, and the packing of the blades and tufts during wringing. FIG. 20 is not intended to show merely a group of blades.

The materials of FIGS. 7 and 16 are readily distinguished from brush-like surfaces, because stiff bristles cannot readily be packed down or bend, and are relatively far apart from one another. Generally, stiff bristles are made that way to provide a more positive penetrating force. However, the penetration capability of conveyor surface 299 is inherent in its material, and any increase is not necessarily derived from stiffening the blade—instead the blades are kept limber, but are given side support, even in the embodiment of FIG. 7.

It will, of course, be understood that the specific exemplifications of the broad invention here disclosed are for illustrative purposes only, and not to be taken as limitative on the scope of the broad invention. It is further to be understood that many mechanical details of the embodiments selected for illustration of the basic invention have been represented only schematically, since the construction of such elements as bearings, conveyor belt drive and idler rollers, as well as wringer roller and the construction of these of rubber, or the mounting of these with spring tension or compression devices, for example, is well within the skill of the art. The invention disclosed is thus to be construed as broad in scope, and to include various means for carrying it out, a few representative embodiments of which have been disclosed to permit those skilled in the art to understand and practice the invention.

What is claimed is:

1. In an apparatus for removing oil from a body of water while moving along the water in a forward direction of motion: a conveyor having a surface to which oil tends removably to adhere, said surface being contactible with the top of a slick of oil to be removed while the slick is on the surface of the body of water, and movable rearwardly of the said forward direction and upwardly relative to the water; a secondary conveyor formed as a belt having a lower loop beneath the surface of the water, and a length disposed rearwardly of the first-named conveyor, and extending rearwardly and upwardly, whereby to form at the elevation of the oil atop the water an initially wedge-shaped path into which the oil slick tends to be drawn as a consequence of movement of the conveyors relative to one another, the first-named conveyor comprising a drum having a substantial portion of its periphery forming a downwardly-facing region so disposed and arranged as to contact the top of the oil slick.

2. Apparatus according to claim 1 in which the said surface comprises a base, and extending from and attached to the base, a plurality of thin and substantially flat blades, which are sufficiently limber so as to be pressed flat against one another, and as a group flat against the base, to squeeze oil from their surfaces, oil tending removably to adhere to said blades.

3. Apparatus according to claim 2 in which the number of blades per unit area of base is such as to cause the blades to give some side support to one another, tending to keep them directed away from the base when endwise force is exerted on the blades.

4. Apparatus according to claim 3 in which a plurality of said blades is gathered in a tuft and attached to the base as a tuft, whereby spacings are formed between the blades into which oil can enter for adherence to the blades.

5. In an apparatus floating on and propelled through a body of water for progressively intercepting and picking up a strip from a layer of oil off the surface of the body of water, the combination of: an endless belt conveyor means having a front end pointing in the direction of propulsion, said conveyor means embodying an endless conveyor belt rising from a lower front end loop to an elevated rearward loop, and lower front end and elevated rearward rotatable drums in said loops; a rotatable pick-up drum conveyor means embodying a pick-up drum mounted above said belt conveyor means for rotation on a horizontal axis generally in the region above said front end drum for the conveyor belt; buoyant carrier means floatable on the body of water and having means for supporting both said conveyor means, with said lower front end conveyor belt drum being located and positioned relative to said carrier means as to be partially below the surface of the body of water, and with said pick-up drum located and positioned relative to said carrier means so that a lower circumferential surface of said drum is located opposite to and adjacent the front end loop of said conveyor and below the surface of the body of water to encounter the layer of oil on the water; means for driving the conveyor belt in a direction with its upper stretch travelling up said inclined path; and means for rotating said drum so that its lower periphery travels in the same direction as said upper stretch of said belt.

6. In an apparatus for intercepting and picking up oil from the surface of a body of water: an endless revolving conveyor belt having a lower front end loop which dips into the water below the surface thereof, and a rearward loop elevated above the water surface; means for driving said belt so that the upper stretch of said belt travels upwardly in the direction from said lower front end loop toward said rearward loop; a rotatable drum located over said upper stretch of said belt in a position to dip into the water and to encounter a layer of oil on the surface thereof; and means for revolving said drum so that the underside of said drum and said upper stretch of said conveyor belt travel in the same direction, so that both tend to move oil picked up thereby in the same direction.

7. Apparatus for removing a lighter liquid floating upon the surface of a body of water, said apparatus comprising first and second substantially horizontally spaced-apart conveyor belt rollers and a third roller located above said first and second rollers, endless conveyor belt means extending around the external periphery of said first, second and third rollers, drive means operatively driving said belt around said rollers, a plurality of plastic bristle-like blades mounted on the surface of said belt on the external surface thereof, and means for removing liquid adhering to said blades, said means being located above said first and second rollers and adjacent said third roller.

8. Apparatus according to claim 7 in which said conveyor belt comprises a base, and in which said bristle-like blades are thin, flexible, and substantially flat.

9. A surface according to claim 8 in which a plurality of said blades is gathered in a tuft and attached to the base as a tuft, whereby spacings are formed between the blades into which oil can enter for adherence to the blades.

10. A surface according to claim 8 in which the conveyor is a linearly-movable conveyor belt.

11. Apparatus according to claim 8 in which the blades are sufficiently limber as to be pressable against one another to lay as a group flat against the base, and in which the means for removing liquid comprises squeezer means to press the blades flat as aforesaid.

12. Apparatus according to claim 11 in which buoyant mounting means supports the rollers, and propulsion means is adapted to propel the mounting means through the water in a forward direction, the drive means being adapted to drive the portion of the belt between the first and second rollers in the opposite direction.

13. Apparatus according to claim 8 in which the belt is substantially planar between the first and second rollers.

14. Apparatus according to claim 7 in combination with buoyant mounting means supporting the rollers, and propulsion means to propel the mounting means through the water in a forward direction, the drive means driving the portion of the belt between the first and second rollers in the opposite direction.

15. Apparatus according to claim 7 in which the belt is substantially planar between the first and second rollers.

16. Apparatus according to claim 11 in which the number of blades per unit area of base is such as to cause the blades to give at least some side support to one another, tending to keep them directed away from the base when endwise force is exerted on the blades.

17. Apparatus according to claim 7 in which a secondary conveyor is formed as a belt having a lower loop beneath the surface of the water, and a length disposed in general parallelism with that portion of the first-named conveyor between the second and third rollers, whereby to form an initially wedge-shaped path into which the lighter liquid tends to be drawn as a consequence of the parallel movement of the conveyors between said second and third rollers, and second drive means to drive the secondary conveyor.

18. Apparatus according to claim 17 in which said first-named conveyor belt comprises a base, and in which said bristle-like blades are thin, flexible, and substantially flat.

19. Apparatus according to claim 18 in which the blades are sufficiently limber as to be pressable against one another to lay as a group flat against the base, and in which the means for removing liquid comprises squeezer means to press the blades flat as aforesaid.

* * * * *